United States Patent
Son et al.

(10) Patent No.: US 9,698,906 B2
(45) Date of Patent: Jul. 4, 2017

(54) APPARATUS FOR RECEIVING AND TRANSMITTING OPTICAL INFORMATION

(71) Applicant: Samsung Electronics Co., Ltd., Gyeonggi-do (KR)

(72) Inventors: Jae-Seung Son, Gyeonggi-do (KR); Seung-Hoon Park, Seoul (KR); Tae-Han Bae, Seoul (KR); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 37 days.

(21) Appl. No.: 14/368,194

(22) PCT Filed: Dec. 21, 2012

(86) PCT No.: PCT/KR2012/011276
§ 371 (c)(1),
(2) Date: Jun. 23, 2014

(87) PCT Pub. No.: WO2013/095048
PCT Pub. Date: Jun. 27, 2013

(65) Prior Publication Data
US 2015/0030335 A1    Jan. 29, 2015

(30) Foreign Application Priority Data
Dec. 23, 2011    (KR) .......................... 10-2011-0140774

(51) Int. Cl.
*H04B 10/116*    (2013.01)
(52) U.S. Cl.
CPC ................. *H04B 10/116* (2013.01)
(58) Field of Classification Search
CPC .................................... H04B 10/116
USPC .......................................................... 398/118
See application file for complete search history.

(56) References Cited

U.S. PATENT DOCUMENTS

| | | | |
|---|---|---|---|
| 5,172,113 A | 12/1992 | Hamer | |
| 6,603,865 B1* | 8/2003 | Yagi | G06T 7/70 382/103 |
| 2006/0056855 A1* | 3/2006 | Nakagawa | G09F 9/33 398/183 |

(Continued)

FOREIGN PATENT DOCUMENTS

| JP | 2007058296 | 8/2007 |
|---|---|---|
| JP | 2009088704 | 4/2009 |

(Continued)

OTHER PUBLICATIONS

Swook Hann(1), Jung-Hun Kim(1), Soo-Yong Jung(2), Chang-Soo Park(2), White LED Ceiling Lights Positioning Systems for Optical Wireless Indoor Applications, ECOC 2010, Sep. 19-23, 2010, Torino, Italy.*

(Continued)

*Primary Examiner* — Shi K Li
*Assistant Examiner* — Omar S Ismail
(74) *Attorney, Agent, or Firm* — The Farrell Law Firm, P.C.

(57) ABSTRACT

An apparatus for transmitting information using a visible light includes at least three light emitting devices, each being installed based on a predetermined interval and direction, and a data transmitting unit to transmit data by controlling the at least three light emitting devices.

13 Claims, 3 Drawing Sheets

(56) References Cited

U.S. PATENT DOCUMENTS

| | | | |
|---|---|---|---|
| 2006/0193634 A1* | 8/2006 | Wang | H04B 10/1141 398/118 |
| 2007/0147843 A1* | 6/2007 | Fujiwara | H04B 10/1143 398/118 |
| 2009/0171571 A1* | 7/2009 | Son | G01C 21/20 701/532 |
| 2011/0069951 A1 | 3/2011 | Son et al. | |
| 2011/0069962 A1* | 3/2011 | Castor | H04B 10/1149 398/115 |
| 2011/0105134 A1* | 5/2011 | Kim | H04B 10/116 455/450 |
| 2013/0266325 A1* | 10/2013 | Giustiniano | H04B 10/116 398/130 |

FOREIGN PATENT DOCUMENTS

| | | |
|---|---|---|
| KR | 1020110109993 | 10/2011 |
| WO | WO 2010/103451 | 9/2010 |

OTHER PUBLICATIONS

Shinichiro Haruyama,Visible Light Communications: Recent Activities in Japan,Smart Spaces: A Smart Lighting ERC Industry—Academia Day at BU Photonics Center, Boston University ,Feb. 8, 2011.*

Swook Hann, Jung-Hun Kim, Soo-Yong Jung, Chang-Soo Park—White LED Ceiling Lights Positioning Systems for Optical Wireless Indoor Applications, ECOC Sep. 19-23, 2010, Torino , Italy—2010 IEEE.*

Swook Hann,White LED Ceiling Lights Positioning Systems for Optical Wireless Indoor Applications,Sep. 19-23, 2010,ECOC 2010, Torino, Italy, pp. 1-3.*

European Search Report dated Jul. 17, 2015 issued in counterpart application No. 12859799.4-1860, 11 pages.

PCT/ISA/220, Search Report issued on PCT/KR2012/011276 (pp. 3).

PCT/ISA/220, Written Report issued on PCT/KR2012/011276 (pp. 4).

* cited by examiner

[Fig. 1a]
QR Code(2D Code)
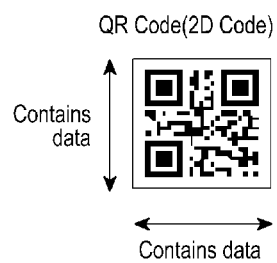
[Fig. 1b]
Bar code
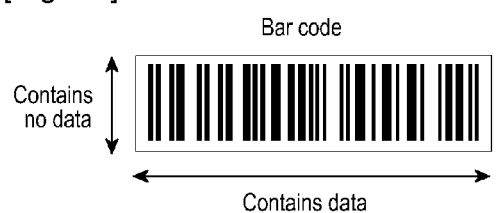
[Fig. 2]
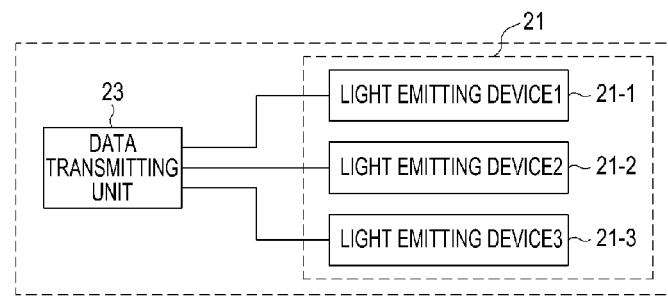
[Fig. 3]
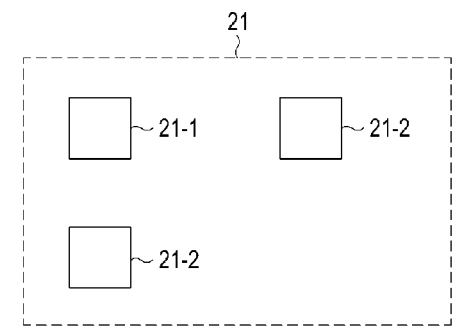

[Fig. 4]
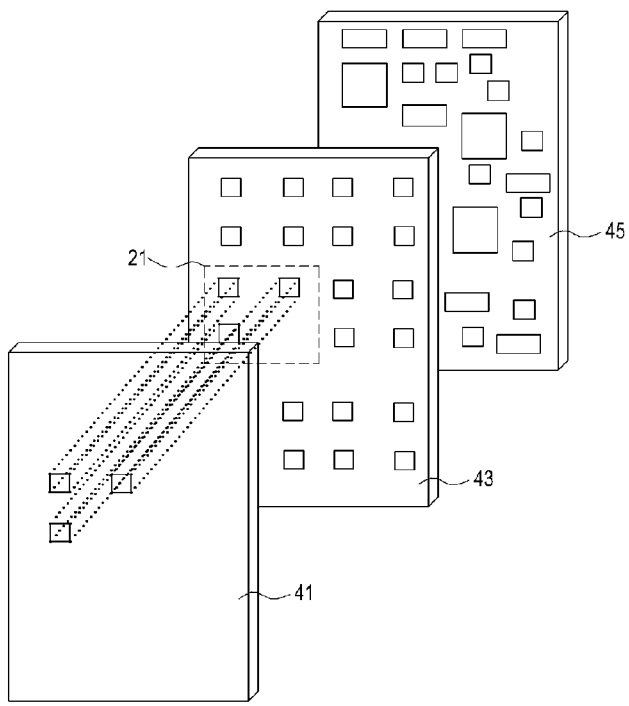
[Fig. 5]
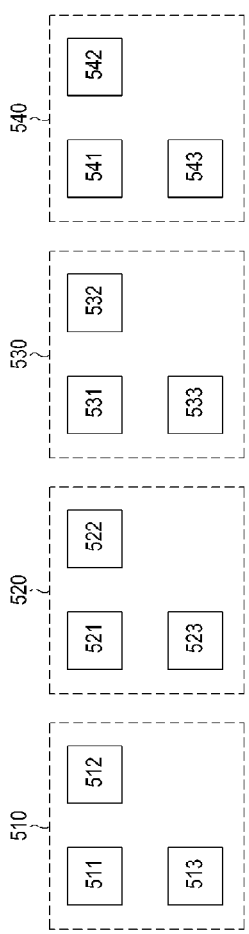

APPARATUS FOR RECEIVING AND TRANSMITTING OPTICAL INFORMATION

PRIORITY

This application is a National Stage application under 35 U.S.C. §371 of International Application No. PCT/KR2012/011276 filed Dec. 21, 2012, which claims priority under 35 U.S.C. §365(b) to Patent Application No. 10-2011-0140774, which was filed in the Korean Intellectual Property Office on Dec. 23, 2011, the content of each of which is incorporated herein by reference.

TECHNICAL FIELD

The present invention relates generally to a visible light communication technology, and more particularly, to an optical information transmitting and receiving apparatus using visible light communication.

BACKGROUND ART

An optical information reading device is well known that optically reads an information symbol, such as a QR code (please refer to FIG. 1A), a barcode (please refer to FIG. 1B), and the like, attached on a product and a document.

The optical information reading device is configured of a small body case including a reading window provided in its one end, a light detector such as a Charge-Coupled Device (CCD) sensor, an imaging unit including an imaging lens, and a lighting device such as a Light Emitting Diode (LED), and the light detector, the imaging unit, and the lighting device are installed in the body case.

When a user desires to read an optical symbol attached on a product using the configuration of the optical information reading device, the user may, for example, enable the reading window to face the product and may dispose the optical information reading device at a predetermined distance away from the product.

The optical information reading device is disposed in this state, and the lighting device applies illumination to the information symbol through the reading window and emits the illumination to the information symbol. A light reflected from the information symbol by the emitted illumination may be incident to the imaging unit through the reading window. The light incident to the imaging unit is in focus by the imaging lens and an image is formed in the light detector. Accordingly, an image corresponding to the information symbol is read by the light detector. Information stored in the information symbol may be decoded based on a light and shade pattern between bright (white) pixels and dark (black) pixels in the read image.

When the optical information reading device is used to read an information symbol printed on a predetermined paper, illumination emitted to the information symbol maybe minor-reflected based on an incident angle of the illumination with respect to the paper, and at least a portion of the information symbol may be recognized to be a bright pixel (white pixel) by the mirror reflection, irrespective of black information stored in the corresponding portion. Therefore, the optical information reading device may cause a problem in that information stored in an information symbol is wrongly read. Also, when a symbol that is directly marked on a metal surface of a product through direct marking is read, the mirror reflection may frequently occur and thus, information stored in an information symbol may not be accurately read.

Also, an amount of information that the information symbol may store is limited and thus, the information symbol generally links address information of a place where large capacity information is stored. Therefore, it is inappropriate that the large capacity information is directly transmitted using the information symbol.

Also, the information symbol stores only information formed during a process that produces the symbol, and has a drawback in that additional information is not added to the formed information symbol or the information symbol is not corrected.

DISCLOSURE OF INVENTION

Technical Problem

Accordingly, an aspect of the present invention is to solve at least the above-described problems occurring in the prior art, and to provide a new format that transmits information included in an information symbol.

Another aspect of the present invention is to provide a method and apparatus for transmitting information in a new format, and a method and apparatus for receiving an information symbol in the new format.

Solution to Problem

In accordance with another aspect of the present invention, an optical information transmitting apparatus for transmitting information using a visible light is provided. The apparatus includes at least three light emitting devices, each light emitting device being installed based on a predetermined interval and direction, and a data transmitting unit to transmit data by controlling the at least three light emitting devices.

In accordance with another aspect of the present invention, an optical information receiving apparatus for receiving information using a visible light is provided. The apparatus includes a light receiving device to receive visible light information from at least three light emitting devices, each light emitting device being installed based on a predetermined interval and direction, and a data receiving unit to detect information received through the light receiving device, and to provide the detected information.

Advantageous Effects of Invention

When the optical information transmitting apparatus is used as an alternative of an information symbol such as a QR code (please refer to FIG. 1A), the relatively larger capacity data when compared to the conventional information symbol such as the QR code (please refer to FIG. 1A) may be directly transmitted.

Also, data desired to be transmitted in real time may be variously modified and corrected as necessary and thus, efficiency of data transmission may be improved.

BRIEF DESCRIPTION OF DRAWINGS

The above and other aspects, features, and advantages of the present invention will be more apparent from the following detailed description taken in conjunction with the accompanying drawings, in which:

FIG. 1A is a diagram illustrating an example of an information symbol of the conventional art;

FIG. 1B is a diagram illustrating another example of an information symbol of the conventional art;

FIG. 2 is a block diagram illustrating a configuration of an optical information transmitting apparatus according to an embodiment of the present invention;

FIG. 3 is a diagram illustrating an example of arrangement of light emitting devices included in an optical information transmitting apparatus according to an embodiment of the present invention;

FIG. 4 is an exploded perspective view of a configuration of an optical information transmitting apparatus according to an embodiment of the present invention;

FIG. 5 is a diagram illustrating another example of arrangement of light emitting devices included in an optical information transmitting apparatus according to an embodiment of the present invention;

MODE FOR THE INVENTION

Figure 6:
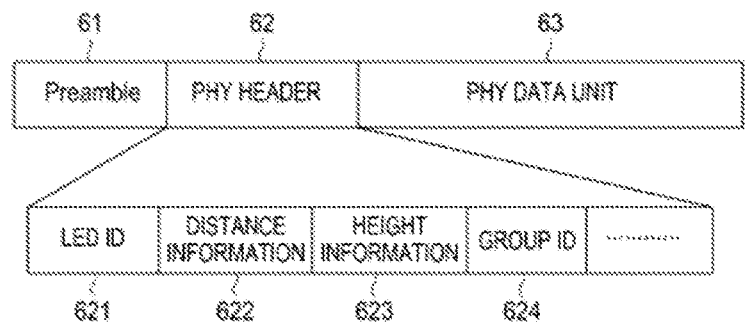
FIG. 6 is a diagram illustrating an example of a data frame transmitted by an optical information transmitting apparatus according to an embodiment of the present invention.

Hereinafter, various embodiments of the present invention will be described with reference to the accompanying drawings. Further, various specific definitions found in the following description are provided only to help general understanding of the present invention, and it is apparent to those skilled in the art that the present invention can be implemented without such definitions.

FIG. 2 illustrates a configuration of an optical information transmitting apparatus according to an embodiment of the present invention. Referring to FIG. 2, the optical information transmitting apparatus includes at least three light emitting devices 21, and a data transmitting unit 23 to transmit data by controlling the at least three light emitting devices 21.

Each light emitting device is installed based on a predetermined interval and direction. For example, referring to FIG. 3 that illustrates a predetermined interval and direction of each light emitting device, the light emitting device 21 includes a first light emitting device 21-1, a second light emitting device 21-2, and a third light emitting device 21-3, and the second light emitting device 21-2 is installed at a predetermined distance (for example, 1 cm) away from the first light emitting device 21-1 to the right, and the third light emitting device 21-3 is installed at a predetermined distance (for example, 1 cm) away from the first light emitting device 21-1 in the lower direction.

The light emitting device 21 may correspond to a light emitting device included in a backlight unit used for a display device. For example, as illustrated in FIG. 4, the optical information transmitting apparatus may include a liquid crystal panel 41, a backlight unit 43, and a driving circuit board 45. The liquid crystal panel 41 expresses a color image through a light incident from the backlight unit 43 by controlling a light penetrating a light penetrable pixel based on? each pixel signal voltage input from the driving circuit board 45. The backlight unit 43 controls an amount of emitted light of a light emitting device included in the back light unit 43 based on a control signal provided from the driving circuit board 45. In addition, the light emitting device 21 may be a portion of a light source included in the backlight unit 43. Also, the data transmitting unit 23 is included in the driving circuit board 45, and controls an on/off timing of the light emitting device 21 included in the backlight unit 43, so as to transmit predetermined information based on a visual light communication protocol.

Although an embodiment of the present invention describes that the light emitting device 21 is a light source included in the backlight unit 43, this may not be limited thereto, and the light emitting device 21 may be a light source that is included separately for communication. Also, although an embodiment of the present invention describes that the light emitting device 21 included in the back light unit 43 is a direct-type backlight that provides a light from the back of the liquid crystal 41, this may not be limited thereto. When a light emitting device is controlled so as to transmit predetermined information based on a visible communication protocol, the light emitting device is qualified as the light emitting device 21 according to embodiments of the present invention.

In addition, although an embodiment of the present invention describes that at least three light emitting devices are formed to be a set, and the light emitting device 21 corresponding to one set is included, this may not be limited thereto. A plurality of light emitting device sets 21 may be included in various locations as necessary.

The data transmitting unit 23 controls the first light emitting device 21-1, the second light emitting device 21-2, and the third light emitting device 21-3, so as to transmit predetermined information based on a visible light communication protocol.

In particular, the data transmitting unit 23 transmits an identifier assigned to each of the first light emitting device 21-1, the second light emitting device 21-2, and the third light emitting device 21-3.

In addition, when an optical information receiving apparatus that receives optical information through the first light emitting device 21-1, the second light emitting device 21-2, and the third light emitting device 21-3 receives and displays information, it is desirable that the data transmitting unit 23 transmits information associated with distances among the first light emitting device 21-1, the second light emitting device 21-2, and the third light emitting device 21-3 so that the received information may be displayed by reflecting a direction, an angle, and a distance when the optical information receiving apparatus faces the first light emitting device 21-1, the second light emitting device 21-2, and the third light emitting device 21-3. For example, the second light emitting device 21-2 transmits a distance between the second light emitting device 21-2 and the first light emitting device 21-1, the first light emitting device 21-1 transmits a distance between the first light emitting device 21-1 and the third light emitting device 21-3, and the third light emitting device 21-3 transmits a distance between the third light emitting device 21-3 and the second light emitting device 21-2.

In addition, when a plurality of light emitting device sets (or groups) 21 exist on a display, data transmission error may occur due to a light emitted from a light emitting device of a neighboring set. That is, as illustrated in FIG. 5, when a first light emitting device group 510, a second light emitting device group 520, a third light emitting device group 530, and a fourth light emitting device group 540 exist, it is desirable that the data transmitting unit 23 controls at least one light emitting device located at a predetermined location from among light emitting devices of each group, for example, a first light emitting device 511, 521, 531, and 541 of each group, so as to transmit a group identifier to identify a corresponding group, so that data transmission error caused by a light emitted from a light emitting device of a neighboring group may be prevented.

Accordingly, as illustrated in FIG. 6, the data transmitting unit 23 may transmit a data frame including a preamble 61, a PHY header 62, and a PHY data unit 63, and the PHY header 62 may include a light emitting device identifier 621, distance information 622, height information 623, and a group identifier 624.

In particular, the first light emitting device 21-1 may generate and transmit the PHY header 62 including the light emitting device identifier 621, the distance information 622, and the group identifier 624, the second light emitting device 21-2 and the third light emitting device 21-3 may generate and transmit the PHY header 62 including the light emitting device identifier 621 and the distance information 622.

Although an embodiment of the present invention describes that the data transmitting unit 23 controls the first light emitting device 21-1, the second light emitting device 21-2, and the third light emitting device 21-3 to generate and transmit the PHY header 62 that necessarily includes the distance information 622, this may not be limited thereto. For example, the distance information is transmitted when the optical information receiving apparatus detects a change in a distance to the optical information transmitting apparatus. When the optical information transmitting apparatus includes a fourth light emitting device that transmits height information, in addition to the first light emitting device 21-1, the second light emitting device 21-2, and the third light emitting device 21-3, the data transmitting unit 23 may configure the PHY header 62 of the data frame transmitted through the first light emitting device 21-1, the second light emitting device 21-2, and the third light emitting device 21-3 to not include the distance information, and may configure the PHY header 62 transmitted by the fourth light emitting device to include the distance information.

Figure 7:
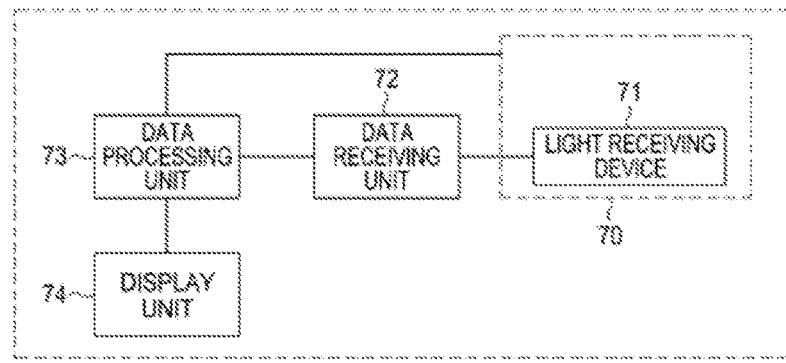
FIG. 7 is a block diagram illustrating a configuration of an optical information receiving apparatus according to an embodiment of the present invention.

FIG. 7 is a block diagram illustrating a configuration of an optical information receiving apparatus according to an embodiment of the present invention. Referring to FIG. 7, the optical information receiving apparatus includes a light receiving device 71 to detect a light generated from a light emitting device and a data receiving unit 72 to detect information received through the light receiving device 71 and to provide the detected information.

The optical information receiving apparatus may further include a camera 70, and the light receiving device 71 may be an imaging device included in the camera 70.

The data receiving unit 72 detects visible light communication data from a signal provided from the light receiving device 71 based on a visible light protocol. In particular, the data receiving unit 72 detects a data frame transmitted from at least three light emitting devices included in an optical information transmitting apparatus. For example, the data receiving unit 72 detects a data frame as illustrated in FIG. 6, and detects the preamble 61, the PHY header 62, and the PHY data unit 63 from the data frame. The data receiving unit 72 detects, from the PHY header 62, identifiers and distance information of the at least three light emitting devices included in the optical information transmitting apparatus. In addition, the data receiving unit 72 detects height information or a group identifier, when a light emitting device included in the optical information transmitting device transmits the height information or the group identifier.

Also, the data receiving unit 72 may store, in a memory, an identifier of a light emitting device, distance information, height information, a group identifier, and the like detected from the PHY header 62 and data included in the PHY data unit 63, or may provide the information to another functional unit, for example, a data processing unit.

In addition, the optical information receiving apparatus according to an embodiment of the present invention may further include a data processing unit 73 and a display unit 74. The data processing unit 73 may combine the identifier of the light emitting device, the distance information, the height information, the group identifier, and the like, and the data included in the PHY data unit 63, and may output the combined data to the display unit 74. For example, the data included in the PHY data unit 63 may correspond to map data and/or location information, and the data processing unit 73 may enlarge, decrease, shift, or rotate the map data and/or location information for displaying, based on the identifier of the light emitting device and the distance information (or the identifier of the light emitting device and the height information).

Also, when the camera 70 of the optical information receiving apparatus performs capturing with respect to a display where the optical information transmitting apparatus is installed, the data processing unit 73 receives image data associated with an image input through the camera in real time, and simultaneously, may receive data transmitted through the optical information transmitting apparatus. Accordingly, the data processing unit 73 may combine the image data input from the camera 70 and the data included in the PHY data unit 63 of the data frame transmitted through the optical information transmitting apparatus, and may display the combined data to the display unit 74. In this example, the data processing unit 73 may perform controlling, for example, enlarging, decreasing, shifting, rotating, and the like, of the data output to the display unit 74 using the identifier of the light emitting device and the distance information (or the identifier of the light emitting device and the height information). For example, the data processing unit 73 calculates a ratio by comparing a distance between light emitting devices represented on a real screen and the distance information associated with the light emitting devices included in the PHY header 62 using identifiers of the light emitting devices and the distance information, and may perform controlling, for example, enlarging, decreasing, shifting, rotating, and the like, of the data output to the display unit 74, based on the calculated ratio.

In addition, although the data processing unit 73 simultaneously receives the image data input from the camera 70 and the data included in the PHY data unit 63 of the data frame transmitted through the optical information transmitting apparatus, the data processing unit 73 may selectively output the image data and the data included in the PHY data unit 63 to the display unit 74. For example, the data processing unit 73 may not output the image data input from the camera 70 to the display unit 74, and may output only the data included in the PHY data unit 63 to the display unit 74. Alternatively, the data processing unit 73 may not output the data included in the PHY data unit 63 to the display unit 74, and may output the image data input from the camera 70 to the display unit 74.

Figure 8:
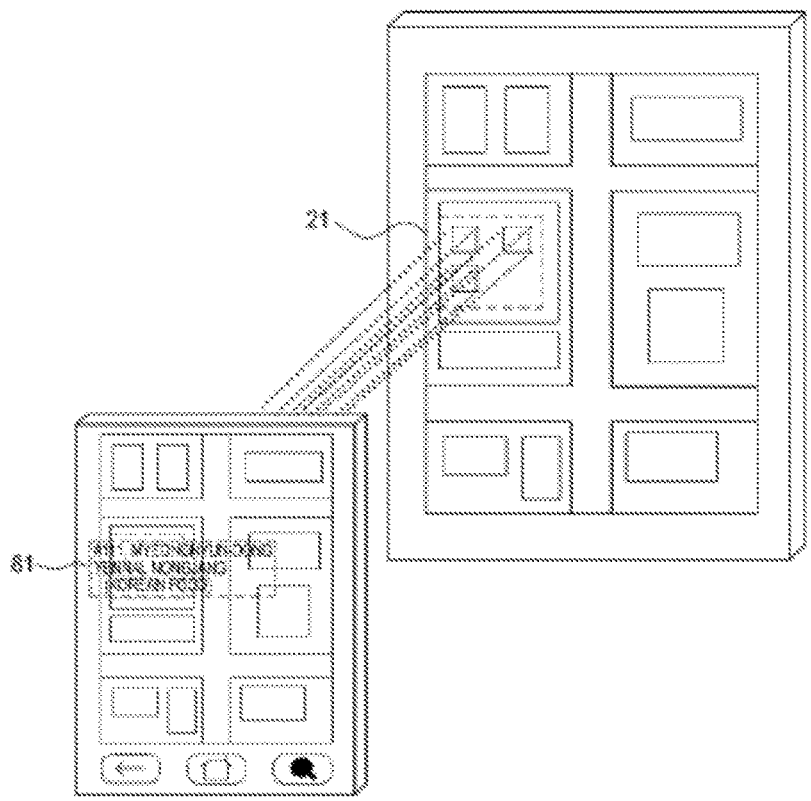
FIG. 8 is a diagram illustrating an operation that displays data that an optical information receiving apparatus receives from an optical information transmitting apparatus according to an embodiment of the present invention.

FIG. 8 is a diagram illustrating an operation that displays data that an optical information receiving apparatus receives from an optical information transmitting apparatus according to an embodiment of the present invention.

FIG. 8 illustrates that the optical information transmitting apparatus outputs map data through a display, and simultaneously, transmits optical information through a light emitting device 21. Accordingly, when the optical information receiving apparatus activates a camera and faces the optical information transmitting apparatus, the optical information receiving apparatus transmits, to a data processing unit through a camera, a map image displayed through the optical information transmitting apparatus. Simultaneously, a light receiving device included in the camera transmits a data frame received through the light emitting device 21 to a data receiving unit, and the data receiving unit detects a preamble, a PHY header, and a PHY data unit from the data frame, and transmits the detected data to the data processing unit. Accordingly, the data processing unit generates, from the detected data, data to be displayed, and provides the display unit with the generated data together with the map image. Therefore, the display unit displays data 81 received through optical information together with the map image.

As described in the foregoing, when the optical information transmitting apparatus is used as an alternative of an information symbol such as a QR code (please refer to FIG. 1A), the relatively larger capacity data when compared to the conventional information symbol such as the QR code (please refer to FIG. 1A) may be directly transmitted.

Also, data desired to be transmitted in real time may be variously modified and corrected as necessary and thus, efficiency of data transmission may be improved.

While the present invention has been shown and described with reference to certain embodiments thereof, it will be understood by those skilled in the art that various changes in form and details may be made therein without departing from the spirit and scope of the present invention as defined by the appended claims.

The invention claimed is:

1. An optical information transmitting apparatus for transmitting information using a visible light, the optical information transmitting apparatus comprising:
   at least three light emitting devices in the optical information transmitting apparatus, each light emitting device being installed based on a predetermined interval and direction; and
   a data transmitting unit configured to control the at least three light emitting devices to transmit data including distance information associated with a neighboring light emitting device of each of the at least three light emitting devices included in a PHY header of a data frame.

2. The optical information transmitting apparatus of claim 1, wherein the data transmitting unit is configured to control the at least three light emitting devices so as to transmit an identifier assigned to each of the at least three light emitting devices.

3. The optical information transmitting apparatus of claim 1, wherein the data transmitting unit is configured to set the at least three light emitting devices as a single group, and control one light emitting device located at a predetermined location from among the at least three light emitting devices to transmit a group ID.

4. The optical information transmitting apparatus of claim 1, wherein the data frame further comprises:
   the PHY header including an identifier assigned to each of the at least three light emitting devices; and
   a PHY payload including data to be transmitted.

5. The optical information transmitting apparatus of claim 4, wherein the data transmitting unit is configured to set the at least three light emitting device as a single group, and control one light emitting device located at a predetermined location from among the at least three light emitting devices so as to transmit a group ID.

6. An optical information receiving apparatus for receiving information using a visible light, the apparatus comprising:
   a light receiving device configured to receive visible light information from at least three light emitting devices in an optical information transmitting apparatus, each light emitting device being installed based on a predetermined interval and direction; and
   a data receiving unit configured to detect distance information associated with a neighboring light emitting device of each of the at least three light emitting devices included in a PHY header of a data frame received through the light receiving device, and provide the detected distance information.

7. The optical information receiving apparatus of claim 6, wherein the data receiving unit is configured to detect and provide a light emitting device identifier assigned to each of the at least three light emitting devices from the data frame.

8. The optical information receiving apparatus of claim 6, further comprising:
   a data processing unit is configured to:
   receive a light emitting device identifier and distance information;
   determine a shift and a rotation of the optical receiving apparatus, based on a distance relationship and a positional relationship of the at least three light emitting devices; and
   provide data by reflecting the shift and the rotation of the optical information receiving apparatus.

9. The optical information receiving apparatus of claim 6, wherein the data receiving unit is configured to detect and provide a group ID transmitted from one light emitting device located at a predetermined location from among the at least three light emitting devices.

10. The optical information receiving apparatus of claim 6, wherein the data receiving unit is further configured to:
    detect the PHY header and a PHY payload based on a predetermined data frame structure;
    detect, from the PHY header, an identifier assigned to each of the at least three light emitting devices, and
    detect from the PHY payload, data that an optical information transmitting apparatus desires to transmit.

11. The optical information receiving apparatus of claim 6, wherein the light receiving device is configured to correspond to an imaging device included in a camera.

12. The optical information receiving apparatus of claim 8, further comprising:
    a camera; and
    a display configured to display data input through the data processing unit.

13. The optical information receiving apparatus of claim 12, wherein the display is configured to simultaneously display an image input through the camera and data input through the data processing unit.

* * * * *